United States Patent Office 2,794,409
Patented June 4, 1957

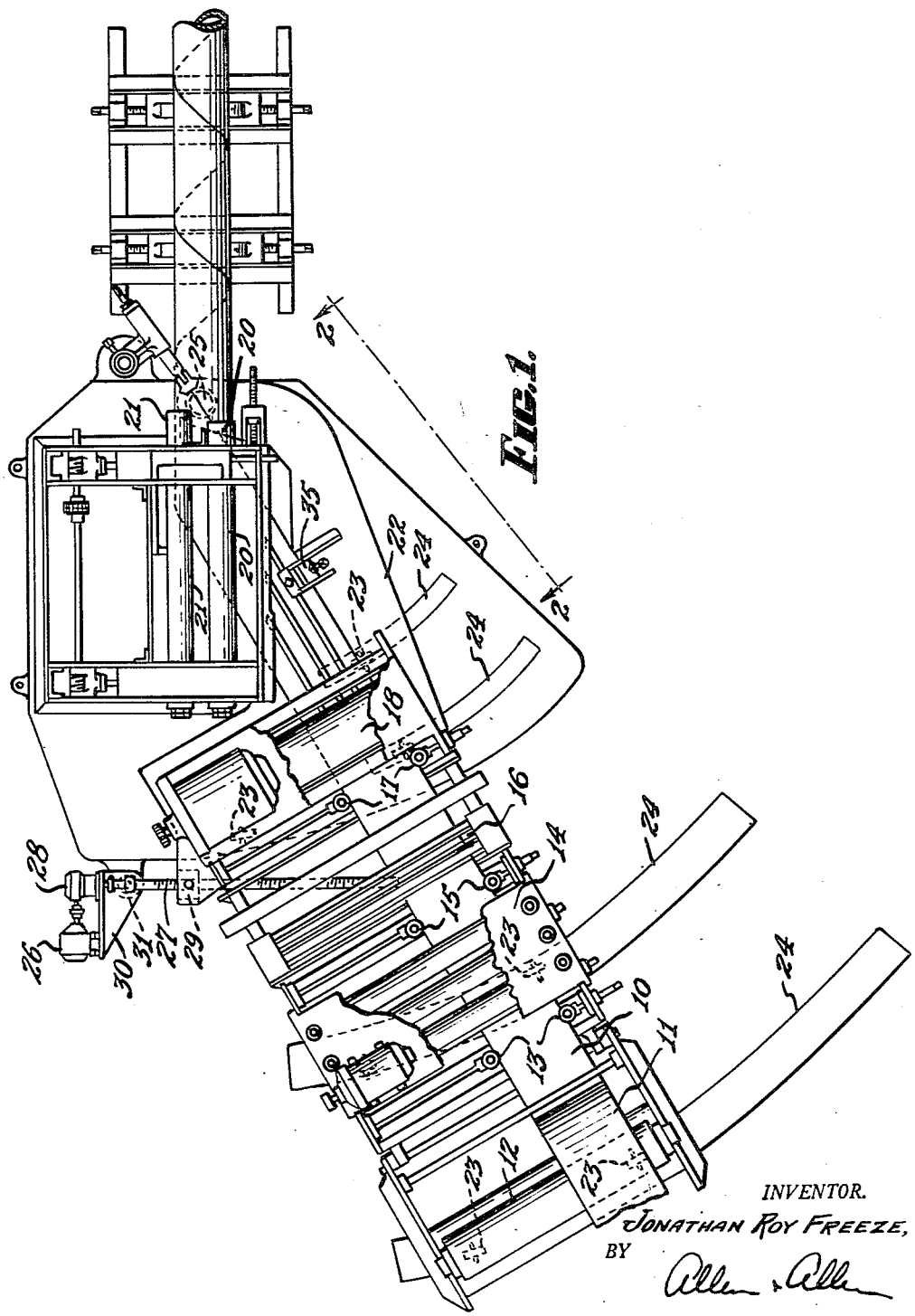

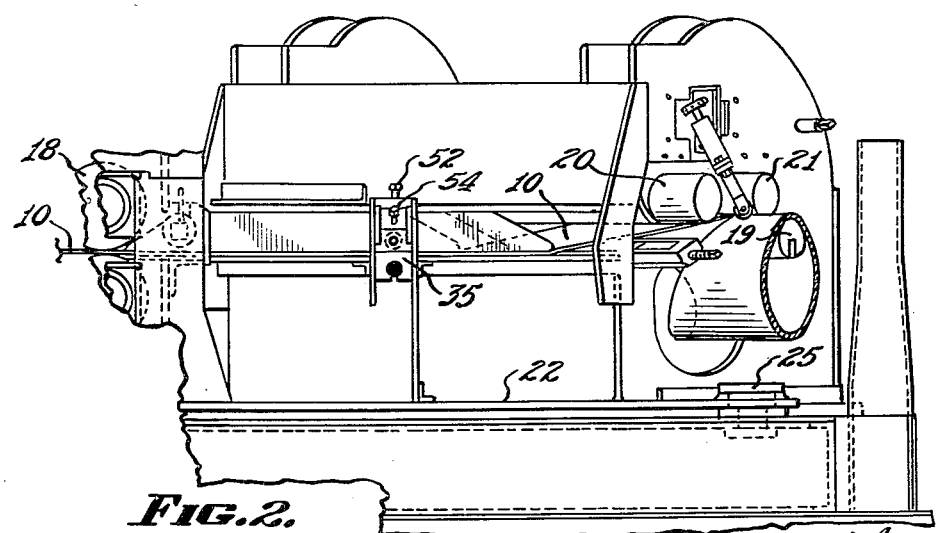
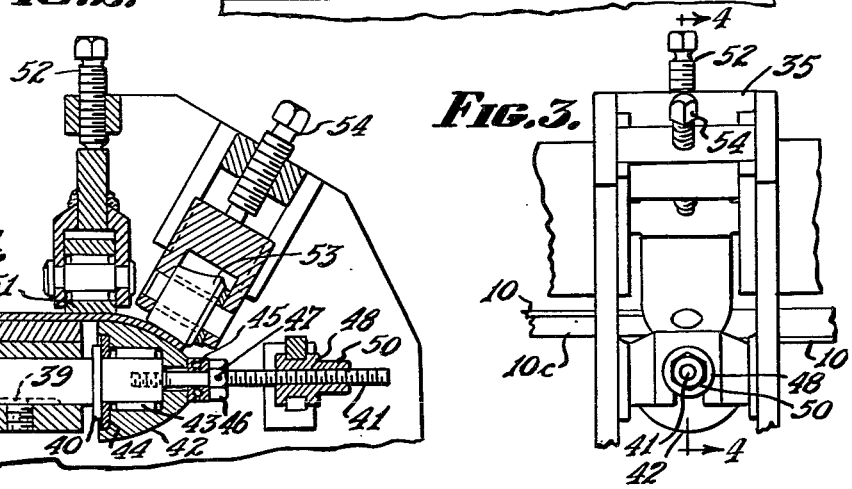
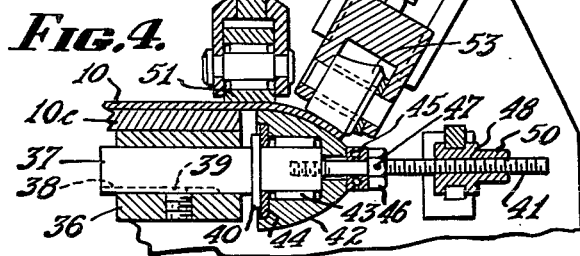
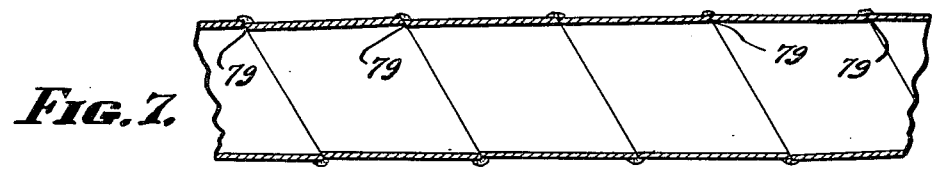
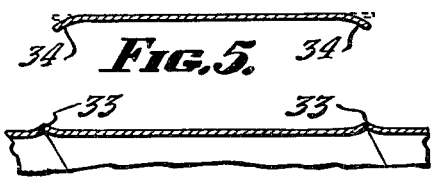

2,794,409

EDGE BENDING MECHANISM FOR SPIRAL WELDED PIPE MACHINE

Jonathan Roy Freeze, Middletown, Ohio, assignor to Armco Steel Corporation, Middletown, Ohio, a corporation of Ohio Application June 28, 1949, Serial No. 101,883, now Patent No. 2,729,180, dated January 3, 1956, which is a division of application Serial No. 8,758, February 17, 1948, now Reissue Patent No. 23,316, dated January 2, 1951. Divided and this application May 11, 1951, Serial No. 225,715

1 Claim. (Cl. 113—35)

This invention relates to an edge bending mechanism for spiral welded pipe machine, and this application is a division of my copending application Serial No. 101,883, filed June 28, 1949, now Patent No. 2,729,180, issued January 3, 1956, which in turn is a division of my application, Serial No. 8,758, filed February 17, 1948, now Reissue Patent 23,316, dated January 2, 1951.

Spiral welded pipe has been made from flat rolled metal for a number of years and such pipe has been more or less commercially successful. For example, pipe has been made commercially for many years in accordance with the teachings of my earlier Patents Nos. 1,793,281 and 1,793,282 dated February 17, 1931, but the manufacture of pipe in accordance with the principles therein set forth has always been attended by a great many difficulties.

When flat rolled metal is formed into a helix, the metal being initially flat, the edges of the metal tend to bend outwardly a small amount so that the welded pipe will be characterized by an inverted V-shaped swell along the weld. This makes the welding operation difficult because the weld is difficult to back up and the resulting pipe is unsightly because of this swell. It is therefore a major object of my invention to provide a mechanism for giving to one or both of the edges of the metal a bend in a direction opposite to the resulting bend mentioned above, to counteract the same so as to produce pipe which is smooth on the outside except for a helical bead resulting from the welding operation.

In this connection, it is another object of my invention to provide means whereby the lateral extent of the edge bend may be adjusted, as well as the degree of the bend, so as to produce smooth pipe in all thicknesses and tempers of strip.

The foregoing and other objects of the invention which will be discussed in more detail hereinafter, or which will be apparent to one skilled in the art upon reading these specifications, are accomplished by that certain construction and arrangement of parts of which the following are exemplary embodiments. Reference is made to the drawings forming a part hereof, and in which:

Figure 1 is a general plan view of the machine with certain parts broken away and other parts removed for clearer understanding.

Figure 2 is an enlarged fragmentary elevational view taken on the line 2—2 of Figure 1.

Figure 3 is an enlarged fragmentary side elevation of the edge bending mechanism.

Figure 4 is a sectional view on line 4—4 of Figure 3.

Figure 5 is a transverse cross-sectional view of the stock showing the edges bent.

Figure 6 is a longitudinal cross-sectional view through the upper convolutions of a pipe showing the condition achieved when the edge bending is omitted.

Figure 7 is a typical longitudinal sectional view through a pipe according to the invention.

Throughout these specifications I have used the word stock to designate the flat rolled metal which is formed into a helix and welded to produce the finished pipe.

The general layout of the machine is perhaps best seen in Figure 1. The metal stock 10 is uncoiled from a coil 11, on the reel 12, and passes between edge guide rollers 13, through a roller leveler indicated generally at 14. It then passes between another pair of edge guiding rollers 15, to the welding station indicated generally at 16. At the welding station 16, ends of the succeeding coils are butt welded together so that pipe can be formed continuously.

Passing between another pair of edge guide rollers 17 the stock passes through the driving roll unit indicated generally at 18. It is the unit 18 which thrusts the stock into the forming mechanism where it is formed into a helix.

When the stock issues from the driving unit 18 it is moving in a substantially horizontal plane and in order to enter the forming mechanism it must ride up an inclined plane. The forming means comprises essentially a fixed bending knee indicated generally at 19 and the heel roller 20 and buttress roller 21. The stock passes over the knee 19 and under the rolls 20 and 21. Since the stock enters the forming mechanism at an angle, the forming means bends the stock to form it into a helix, and as a convolution is formed its rear edge comes to a position adjacent the forward edge of the entering stock, and substantially at this point the weld is made. The portion of the machine including the coil reel, leveler, welding station and driving rolls, is mounted on a frame indicated generally at 22, which frame is provided with casters 23 riding on the curved rails 24, and the entire unit and the frame 22 is swung about the pivot point 25 to produce the desired helical angle. This is accomplished by means of a motor 26 driving the screw 27 through the gear reducer 28. The screw 27 engages to a nut 29 which is a part of the swingable frame. The motor, gear reducer and screw are mounted upon a bracket 30 which is pivoted at 31, and it will be clear that the motor 26 in turning will cause the feed unit to be moved in an arcuate path about the pivot point 25.

Details of the mechanisms for transversely bending the sheet strip are disclosed and claimed in the said copending application, Serial No. 8,758, filed February 17, 1948. Details of the apparatus for feeding and forming the sheet strip stock into a helix and concurrently correcting irregularities at the seam due to the camber of the stock are disclosed and claimed in my copending application Serial No. 225,716, filed May 11, 1951, now Patent No. 2,752,873, issued July 3, 1956. Details of a backing shoe in connection with the welding operation are disclosed in my said Reissue Patent No. 23,316. In the present application I shall describe in detail and claim only the apparatus having to do with the edge bending of the stock.

When stock which is initially flat transversely of its length is formed into a helix it is characteristic that the edges of the stock will turn up a small amount in an upward direction so that the welded pipe will be characterized by an upstanding swell following along the seam. This condition is clearly shown at 33 in Figure 6. It has been found that this objection can be eliminated if the stock before it enters the forming rolls has its edges deformed in an opposite direction as indicated at 34 in Figure 5. When stock configured as in Figure 5 is formed into a helix, the tendency discussed above removes the prebending indicated at 34 and results in a truly cylindrical pipe such as shown in Figure 7.

In small machines it will generally be only necessary to counterbend one edge of the stock. With large machines and with thick stock it is preferable to counterbend both edges of the stock. In the drawings the counterbending mechanism has been shown for one edge of the stock only, but it will be clear that if required by the thickness of the stock it could be reproduced on the other edge as well. In Figure 1 the edge counterbending mechanism is generally indicated at 35. This mechanism is shown in more detail in Figure 4 where the stock is again indicated at 10 as it passes over the plate 10c. Secured to the underside of the plate 10c is a bearing 36 for the roller shaft 37. The shaft 37 may be provided with a keyway at 38 and be held against rotation by a key 39, so that the shaft 37 is held against rotation but may be moved axially. The shaft 37 has a shoulder 40 and has secured to its end a screw 41. A bullet shaped roller 42 bears on the shaft 38 through the needle bearing 43 and is held against axial movement by the thrust bearing 44, on the inside, and a thrust bearing 45 on the outside. The parts are held in assembled relation by the nut 46, which may be pinned as at 47 when the desired adjustment is achieved. A nut 48 is rotatably mounted in the frame element 49 and is provided with a head 50 for use with a wrench. The nut 48 engages the screw 41 so that upon rotation thereof the bullet shaped roller 42 may be moved axially toward left or right, as seen in Figure 4. The base, or widest portion, of the roller 42 is substantially coplanar with the upper surface of the plate 10c.

The stock 10 is caused to conform to the roller 42 by two rollers bearing on the stock from above. The roller 51 is a cylindrical roller mounted as shown for adjustment by means of the screw 52, and the roller 51 is positioned to bear on the stock above the edge of plate 10c and the edge of the bullet shaped roller 42. A curved roller 53 having a concave transverse face corresponding to the convexity of the bullet shaped roller 42, is mounted for adjustment in an angular direction by means of the screw 54. The roller 53 is arranged to bear against the stock edge in the region of the small end of the roller 42. The two rollers 51 and 53 together insure that the stock conforms closely to the curve of the bullet shaped roller 42.

For different thicknesses of stock and other different conditions of temper or springiness, a different amount and degree of edge bending may be called for. With the construction shown in Figure 4 adjustment of the roller 42 toward the left or right in Figure 4 will vary the amount of the edge which is bent and the degree to which it is bent. The roller 53 is simply adjusted in accordance with the position of the roller 42, and in accordance with the thickness of the stock being handled. The roller 51 need only be adjusted for different thicknesses.

The formed pipe as shown in Figure 7 will here and there be characterized by very slightly stepped configurations as indicated at 79. The condition is considerably exaggerated in Figure 7 and actually the pipe diameter is substantially constant. The slight variations indicated at 79 compensate for the camber in the strip and prevent the pipe diameter from changing substantially in one direction or the other. The details of the camber control mechanism are disclosed and claimed in my copending application Serial No. 225,716, filed May 11, 1951, now Patent No. 2,752,873, issued July 3, 1956, and will not be described further herein.

While certain aspects of the invention have been described in considerable detail, this has been primarily by way of illustration. Many modifications may be made in details of construction without departing from the spirit of the invention.

Having now fully described the invention, what I claim as new and desire to secure by Letters Patent is:

In a machine for making spiral welded pipe from metal stock, an edge bending mechanism comprising a bullet-shaped roller over which an edge of said stock passes, said roller being disposed with its axis substantially normal to the direction of movement of said stock and in a plane parallel to the stock and with its smaller end outwardly directed, said bullet-shaped roller being axially adjustable, a second roller arranged to ride on the stock over the large end of said bullet-shaped roller and having its axis parallel to the axis of said bullet-shaped roller, said second roller being adjustable toward and away from said bullet-shaped roller along a path normal to the axis of said bullet-shaped roller, and a third roller arranged to ride on the stock edge and having its axis inclined with respect to the bullet-shaped roller axis to cause said edge to conform to the shape of said bullet-shaped roller, said third roller being adjustable toward and away from said bullet-shaped roller along a path normal to the axis of said third roller.

References Cited in the file of this patent

UNITED STATES PATENTS

| | | |
|---|---|---|
| 711,471 | Chambers et al. | Oct. 21, 1902 |
| 1,261,735 | Hunker | Apr. 2, 1918 |
| 1,627,681 | Woodruff | May 10, 1927 |
| 1,793,281 | Freeze | Feb. 17, 1931 |
| 1,884,658 | Gladkov et al. | Oct. 25, 1932 |
| 2,062,875 | Gardner | Dec. 1, 1936 |
| 2,442,943 | Wayne | June 8, 1948 |

FOREIGN PATENTS

| | | |
|---|---|---|
| 309,450 | Italy | Aug. 6, 1933 |
| 512,266 | Great Britain | Aug. 31, 1939 |